United States Patent
Andersson et al.

(10) Patent No.: US 12,308,949 B2
(45) Date of Patent: May 20, 2025

(54) LINK PROFILING FOR ASYMMETRIC DELAY COMPENSATION

(71) Applicant: Net Insight AB, Solna (SE)

(72) Inventors: Michael Andersson, Osterskar (SE); Magnus Danielsson, Stocksund (SE)

(73) Assignee: Net Insight AB, Solna (SE)

( * ) Notice: Subject to any disclaimer, the term of this patent is extended or adjusted under 35 U.S.C. 154(b) by 345 days.

(21) Appl. No.: 18/001,979

(22) PCT Filed: Jun. 18, 2021

(86) PCT No.: PCT/EP2021/066632
§ 371 (c)(1),
(2) Date: Dec. 15, 2022

(87) PCT Pub. No.: WO2021/255249
PCT Pub. Date: Dec. 23, 2021

(65) Prior Publication Data
US 2023/0231641 A1    Jul. 20, 2023

(30) Foreign Application Priority Data

Jun. 18, 2020   (SE) .................................. 2050736-4

(51) Int. Cl.
*H04J 3/06*    (2006.01)
(52) U.S. Cl.
CPC .................................. *H04J 3/0658* (2013.01)
(58) Field of Classification Search
None
See application file for complete search history.

(56) References Cited

U.S. PATENT DOCUMENTS

| 8,416,763 B1 | 4/2013 | Montini et al. |
| 9,414,239 B2* | 8/2016 | Brunk .................... G01S 5/0289 |
| 2013/0181865 A1* | 7/2013 | Hannan ...................... G01S 5/10 |
| | | 342/357.29 |
| 2014/0192826 A1* | 7/2014 | Zampetti ............... H04J 3/0658 |
| | | 370/503 |

(Continued)

FOREIGN PATENT DOCUMENTS

| CN | 109525353 A | 3/2019 |
| EP | 2941842 A1 | 11/2015 |
| WO | WO-2014107717 A1 | 7/2014 |

OTHER PUBLICATIONS

International Search Report for International Application No. PCT/EP2021/066632 dated Oct. 8, 2021.

*Primary Examiner* — Kodzovi Acolatse
(74) *Attorney, Agent, or Firm* — Harness, Dickey & Pierce, P.L.C.

(57) ABSTRACT

There is provided a GNSS independent method for asymmetry delay error compensation to minimize a time difference bias when using two-way time transfer in a communication network. The method includes establishing a bidirectional virtual path comprising at least one link path, LP1-LP4, over the network for communication between a first node A and a second node B by sending a bidirectional data stream over the virtual path and utilizing previously stored link profiles associated with a delay correction factor or a calibrated virtual path or a stable local clock in holdover mode to provide new delay correction factor to minimize a time difference bias in the local time in the second node.

15 Claims, 3 Drawing Sheets

(56) References Cited

U.S. PATENT DOCUMENTS

| | | | |
|---|---|---|---|
| 2015/0181385 A1* | 6/2015 | Zampetti | H04W 56/0035 |
| | | | 370/326 |
| 2016/0170437 A1* | 6/2016 | Aweya | H04B 10/071 |
| | | | 713/503 |
| 2016/0302165 A1* | 10/2016 | Da | H04W 56/001 |
| 2017/0245228 A1* | 8/2017 | Ruffini | H04L 12/2801 |
| 2018/0076949 A1* | 3/2018 | Mayer | H04L 7/0075 |
| 2018/0132199 A1* | 5/2018 | Zhang | H04W 56/0065 |
| 2019/0379475 A1* | 12/2019 | Seethamraju | H04J 3/0688 |
| 2020/0382625 A1* | 12/2020 | Medard | H04W 28/0257 |
| 2021/0211786 A1* | 7/2021 | Loprieno | H04B 10/0771 |
| 2024/0396836 A1* | 11/2024 | Andersson | H04J 3/0679 |

\* cited by examiner

LINK PROFILING FOR ASYMMETRIC DELAY COMPENSATION

CROSS-REFERENCE TO RELATED APPLICATIONS

This application is a national phase under 35 U.S.C. § 371 of PCT International Application No. PCT/EP2021/066632 which has an International filing date of Jun. 18, 2021, which claims priority to Swedish Application No. 2050736-4, filed Jun. 18, 2020, the entire contents of each of which are hereby incorporated by reference.

TECHNICAL FIELD

The present invention relates to the field of communication network systems for node-to-node transmission of data utilizing two-way time transfer time synchronization, and more particularly to a GNSS independent method for asymmetry delay error compensation to minimize a time difference bias when using two-way time transfer in a communication network.

BACKGROUND OF THE INVENTION

The need for providing accurate time and frequency synchronization in communication networks is increasing in many industries, including, media, finance, automation, power grids and mobile networks, but also in many other areas. A common way for providing such accurate time and frequency synchronization is by obtaining accurate clocks from Global Positioning System (GPS) and other Global Navigation Satellite System (GNSS) systems directly into nodes in the communication network. However, there are also many protocols for delivering time synchronization over terrestrial optical, microwave links, Ethernet, MPLS and IP networks using protocols such as Network Time Protocol (NTP), IEEE1588 (PTP) and other proprietary Time Transfer solutions.

These terrestrial protocols are based on so called two-way time transfer methods measuring individual link delays based on local clocks and the Round-Trip Time (RTT) to calibrate the local clocks link by link. However, most such protocols assume that the link delay is equal to RTT/2 and have difficulties to handle asymmetric delays, i.e., where the delay from a first Node A to a second Node B is different than the delay from the second Node B to the first node A. If this is a static delay this can be calibrated and handled thereafter. However, asymmetry may also occur dynamically during operation and is something that break many two-way time transfer protocols and thus there is a need to at least improve the ability of handling such asymmetry of delays without using GPS/GNSS. With the increase of jamming and spoofing of GPS/GNSS systems, it would fulfil a long-felt need to build GNSS-independent solutions.

SUMMARY OF THE INVENTION

It would be advantageous to provide an at least improved and reliable method for handling dynamically changing and asymmetric link delays in two-way time transfer based communication systems which in normal operation is independent of GNSS. This object is achieved by a method according to the present invention as defined in the independent claim 1.

Thus, in a first aspect of the present inventive concept, there is provided a GNSS independent method for asymmetry delay error compensation to minimize a time difference bias when using two-way time transfer in a communication network comprising establishing at least one bidirectional virtual path comprising at least one link path over the network for communication between a first node and a second node.

The method comprises sending a bidirectional data stream over the at least one virtual path, and at at least one of the first node and second node, monitoring at least one data stream characteristics of the received data stream and/or using at least one link path property. If determining that at least one of the monitored data stream characteristics or link path property matches to a predetermined link profile, deriving a delay correction factor of the predetermined link profile; or else calculating a new delay correction factor for the VP by using an estimated time error over the VP using two-way time transfer and a calibrated time difference of a trusted source. The estimated time error between the first node and the second node over the virtual path is then compensated using the delay correction factor.

According to an embodiment, the trusted source is one of a calibrated virtual path from a node in a calibrated state, a local clock in holdover mode, e.g. a stable local clock in holdover mode entered directly from a calibrated state, and a directly connected calibrated clock source.

By compensating the estimated time error using the delay correction which is retrieved from a matching link profile or by calculating a new delay correction factor using a calibrated trusted source, such as another trusted calibrated virtual path with a known link profile connected to the node, or a stable local clock in holdover mode, the time error compensation is advantageously made independent of GNSS.

According to an embodiment the trusted source is one of a calibrated virtual path from a node in a calibrated state, a local clock in holdover mode, and a directly connected clock source. The holdover mode may refer to the local clock being in a phase-only holdover or phase- and frequency holdover.

According to an embodiment, the method further comprises communicating state of calibration of the first node and second node to neighboring nodes, which is advantageous as this information is used to According to an embodiment, the method further comprises further comprising storing a new link profile based on said at least one data stream characteristics of the received data stream and/or said at least one link path property and the new delay correction factor.

According to an embodiment, the method further comprises if determining that the first node and the second node are in calibrated state setting the state of calibration of the at least one virtual path and/or link profiles of said at least one virtual path as calibrated.

According to an embodiment, the at least one virtual path is calibrated through self-assignment.

According to an embodiment, the method further comprises adjusting a stored predetermined link profile or creating a replica of a stored link profile based on said monitored at least one data stream characteristics and/or said at least one link path property.

According to an embodiment, the method further comprises upon detecting change in at least one selected monitored data stream characteristics, or upon detecting change in time data during monitoring of at least one data stream characteristics: comparing a current value of the selected monitored data stream characteristics with corresponding data in said stored link profiles, and if there is a match use a delay correction factor of a best fit link profile, or else go to holdover.

According to an embodiment, the change in time data is detected with respect to a local clock, an external clock or with respect time data of other virtual paths.

According to an embodiment, the detected change is a change in link path properties, e.g. type of link, number of link hops, deviation in time in at least one of RTT, PDV, packet loss rate, estimated one-way delay, and estimated time error.

According to an embodiment, the method further comprises comparing time in relation to said first node and said second node, wherein said comparison of time is used to steer said second node acting as a slave to the time of the first node acting as a master.

According to an embodiment of the method, if determining that the monitored data stream characteristics or link path property do not match to a predetermined link profile: the method further comprises determining a new additional link profile based on the at least one data stream characteristics and/or link path property. In a case when both the first node and the second node have a calibrated time, the virtual link path can now be calibrated using the new link profile and the time error of the virtual path may be compensated using the new link profile. A created link profile may be related to the at least one virtual path or at least one of the at least one link paths of the virtual path.

According to an embodiment of the method, calibrating the local time in the second node is based on a time difference in relation to a trusted source in order to synchronize it with the first node.

The use of the term trusted source herein, may refer to one of a local clock, or a node in the network which is reachable over a link path with a known link delay asymmetry or no link delay asymmetry, a clock time received in a data stream over the at least one virtual path, or some other trusted time sources, e.g. a well-known and established time source, e.g. a time scale at any National Metrology Institute (NMI). A trusted source may further be defined as a time source for e.g. a global time standard such as Coordinated Universal Time (UTC) for which the network intends to distribute time. The act of calibrating the local time in a node or calibrating a virtual path in the network is thus performed for providing consistency with e.g. UTC.

It would also be possible to use GPS/GNSS in the node to calibrate the time offset of the new path, but this is well-known technology and would make the system dependent on GPS/GNSS for its normal operation, which is contrary to the idea of the invention.

Calibrating the local time is preferably performed prior to applying a stored or new identified calibration profile which may also be referred to as a link profile to calibrate the virtual path. However, the local time of the second node is advantageously calibrated/trimmed continuously, periodically or based on a predetermined condition such as when connecting to a well trusted source. That is the second node is synchronized to a source clock when available, thereby providing calibration or recovering of a calibrated status of the second node.

According to an embodiment of the method, it further comprises, after calibrating the first node and the second node (or determining that the first and second node are calibrated), calibrating the at least one virtual path.

According to an embodiment of the method, it further comprises adjusting a stored link profile or creating a replica of a stored link profile based on the monitored at least one data stream characteristics and/or the at least one link path property at predetermined conditions. The link profile of a virtual path may include profile data including at least one of: expected round trip time, RTT, packet loss, packet delay variation, PDV, wander, a quality indicator to determine degree of trusted link), link path delay in one or both directions between the first node and the second node, and link path delay difference for directions between the first node and the second node B, average delay between the first node and the second node, calibration factors indicating the amount of asymmetry in the link path delay in respective opposite directions of the virtual path, and a time correction factor which represents the correction factor needed to compensate for delay over the link paths, and which thus may more correctly be referred to as the delay correction factor. To obtain the best accuracy for the asymmetry change detection, using several data stream characteristics is preferable. For example using only RTT would not be sufficient since different LPs can have the same RTT value but with very different asymmetries.

The at last one data stream characteristics or link property may comprise at least one of: (visible) nodes in the link path, round trip time (RTT), packet loss, packet delay variation (PDV), wander, minimum link path delay in one or both directions between the first node and the second node, maximum link path delay in one or both directions between the first node and the second node, average link path delay between the first node and the second node, calibration factors indicating the amount of asymmetry in the link path delay in respective opposite directions of the virtual path, link path delay difference for directions between the first node and the second node.

According to an embodiment of the method, at least one, or optionally a plurality of, received data stream(s) is monitored with respect to at least one data stream characteristics, and upon detecting changes, in at least one selected monitored data stream characteristics, or upon detecting change in time data during monitoring of at least one data stream characteristics a current value of the selected monitored data stream characteristics is compared to corresponding data in the stored link profiles, and if there is a match this is utilized for switching to the stored known or best fit link profile, or switching to a delay correction factor of a best fit link profile; or if no match is found signal error and go to holdover.

The change in data stream characteristics or time data may be monitored within some predetermined ratio. Time data may refer to for instance detecting a new RTT, a new value on PDV, or change in packet loss rate etc.

An (optionally abrupt) change in time data may be detected with respect to a stable local clock, an external clock or with respect to other time data of other virtual paths. The detected change may also be a deviation in time in one of RTT, PDV, and packet loss rate.

According to an embodiment of the method, if further comprises comparing time in relation to the first node and the second node. The comparison of time may be used to steer the second node acting as a slave to the time of the first node acting as a master.

According to an embodiment of the method, the step of establishing the at least one virtual path between the first node and the second node comprises providing a configuration utilizing initial (or first) configuration data between the first node and second node the method further comprising: for a selected virtual path of the at least one virtual paths: probing the selected virtual path utilizing a probing function applying a plurality of predetermined probe configuration data, which may be a set of probe configuration data, onto the selected virtual path, monitoring (which may include storing and/or analyzing) performance over the selected virtual path for each one of the plurality of probe configuration data; and determining optimized configuration data for the configuration between the first node and second node based on the monitored performance.

According to an embodiment of the method, the selected virtual path is parallel to the virtual path over which the bidirectional data stream is sent.

The probing function may further comprise performing a trace route for each probe configuration data. The probe configuration data comprises at least one of settings for differentiated services code point (DSCP), Ethernet priority, bitrate, and maximum transmission unit (MTU), and may be applied stepwise.

According to an embodiment of the method, the optimized configuration data is determined with respect to achieving a lowest jitter performance.

According to a second aspect of the inventive concept, there is provided a node in a communication system arranged for node to node communication, the node comprising means for performing a method according to the present inventive concept. It may further comprise means for transmitting the outgoing data stream, e.g. a transmitter. The node may comprise a memory storing computer-readable instructions, and a processor configured to execute the computer-readable instructions to a method according to any preceding claim.

In a communication system arranged for node to node communication, the node comprises a memory storing computer-readable instructions, and a processor configured to execute the computer-readable instructions to a method according to the present inventive concept. Further, according to a third aspect of the inventive concept, there is provided a non-transitory computer readable storage medium storing computer-readable instructions executable by a processor to cause the processor to perform the method presented herein.

Embodiments of the present inventive method are preferably implemented in a distribution, media content provider, or communication system by means of software modules for signaling and providing data transport in form of software, a Field-Programmable Gate Array (FPGA), an Application Specific Integrated Circuit (ASIC) or other suitable device or programmable unit, adapted to perform the method of the present invention, an implementation in a cloud service or virtualized machine (not shown in diagrams). The software module and/or data-transport module may be integrated in a node comprising suitable processing means and memory means, or may be implemented in an external device comprising suitable processing means and memory means, and which is arranged for interconnection with an existing node. The node may be arranged at an edge node, e.g. in communication with a streaming edge server, or is integrated in/or constitutes a streaming edge server.

Further objectives of, features of, and advantages with, the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

The above will be better understood through the following illustrative and non-limiting detailed description of preferred embodiments of the present invention, with reference to the appended drawings, where the same reference numerals will be used for similar elements, and wherein.

All the figures are schematic, not necessarily to scale, and generally only show parts which are necessary in order to elucidate the invention, wherein other parts may be omitted or merely suggested.

DETAILED DESCRIPTION OF PREFERRED EMBODIMENTS

Figure 1:
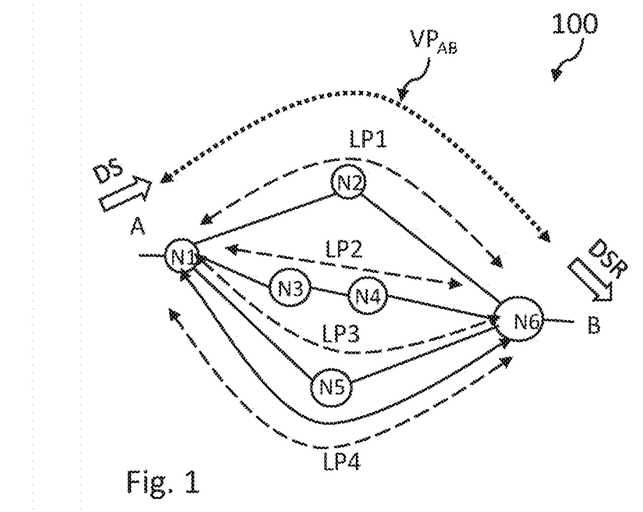
FIG. 1 is a schematic block diagram illustrating a node to node communication network in view of which aspects and embodiments according to the inventive concept is explained.

Referring now to FIG. 1, which is a block diagram schematically illustrating a communication network system 100 of e.g. IP type for live distribution of media content, in view of which aspects of the present inventive concept will be described. It should however be noticed that other types of networks, e.g. terrestrial optical, microwave links, Ethernet, MPLS and IP networks using protocols such as Network Time Protocol (NTP), IEEE1588 (PTP) and other proprietary Time Transfer solutions are applicable within the present inventive concept.

The invention is especially useful when transferring time between two (sync) nodes across a path with many underlying network nodes (e.g., routers, switches, radio link systems or optical transport nodes) that are not time sync aware. These intermediate non-sync aware nodes will add static and dynamic delays which often results in asymmetrical delays as stated above. In this invention we call the end-to-end path between the sync nodes virtual path (VP), and the different paths through the intermediate nodes link paths (LP). Different LPs will typically generate different asymmetries, which in normal two-way time transfer solutions will create time offsets from the correct time.

Definition Virtual Path

To continue with reference to FIG. 1, in the network 100 a first node, Node A (N1) and a second node, Node B (N6) has established a bidirectional virtual path $VP_{AB}$ for communication between Node A and Node B in a subnetwork formed by nodes N1-N6. A virtual path is typically a collection of virtual channel connections made through a communication network, the latter which herein after are also referred to as link paths, LP. The virtual path $VP_{AB}$, between the first Node A and the second Node B, as well as its individual link paths, LP1, LP2, LP3 and LP4 in FIG. 1, can be either permanently established or set up dynamically for a specific time needed to transmit information through the network. As can be deducted from FIG. 1, at least theoretically the virtual path $VP_{AB}$ can include a number of different physical paths as illustrated in Table 1. In the exemplifying embodiments herein, we hereinafter refer to the corresponding link paths: LP1, LP2, LP3 and LP4. LP4 in FIG. 1 represents a PTP-path which may be used as a trusted source/calibrated virtual path with a known link profile.

TABLE 1

| Physical Path | Virtual Path | Link Path |
|---|---|---|
| (N1, N2, N6) | (N1, N6) | LP1 |
| (N1, N3, N4, N6) | (N1, N6) | LP2 |
| (N1, N5, N6) | (N1, N6) | LP3 |
| (N1, N6) | (N1, N6) | LP4 |

Calibrating Node B and the Virtual Path

According to an embodiment of the invention, initially, after the virtual path $VP_{AB}$ is established, Node B is calibrated using a trusted source providing a trusted time information. The trusted source may be a local clock or time received from Node A when the time information is transmitted via the network 100 with very well-known asymmetry or preferably no asymmetries where a delay in both directions over a link path each is exactly RTT/2. Such calibration of Node B either makes the time of Node B to have nominally zero offset with respect to the trusted source or have a known offset with respect to the trusted source, which can be used to compensate the offset in time information received in the data stream. With Node B calibrated, and assuming that Node A is calibrated, a link path between them can be calibrated. When Node A is calibrated, and the virtual path is calibrated, then Node B can recover its calibrated status at required times.

For a situation as in the exemplifying embodiment described with reference to FIG. 1, where there can be multiple link paths between Node A and Node B, each of these will require a calibration, and thus multiple calibrations need to be supported for the same virtual path $V_{AB}$, one for each LP. This invention shows how the node automatically performs such calibration of each new LP and stores the calibrated time offset with a corresponding link profile consisting of one or several data stream characteristics for that LP. When the system detects a change of the data stream characteristics, it will enter holdover mode of the local clock and search through the stored link profiles. If it can find a match to an existing profile with the same data stream characteristics, it will apply the stored link time offset and start using the new LP/VP link to provide the local time (phase and frequency) for the node clock. If it cannot find a match, it will see if it has any other incoming LP/VP, for which it has a calibrated state. If so, it will start using the link time offset of that LP/VP, and start providing the local time (node clock) using that link. In the case, it cannot find any matching profile for any incoming LP/VP, it will use the local clock in its holdover mode as trusted source and create and store a new link profile with a data stream characteristics and corresponding link time offset and applying that for the new LP/VP and using the now calibrated link for providing the node clock.

According to an embodiment, the method comprises determining if the node is in a calibrated state; and communicating its calibrated state to neighboring nodes. The node is in a calibrated state when the node is connected to a calibrated virtual path from a calibrated sync node or is connected to a local trusted source. All virtual paths between two nodes having a state of calibration in calibrated state can be calibrated by calculating a time offset per virtual path based on the respective calibrated time offsets of the nodes and information from each respective path.

Calibration Factor

In two-way time transfer methods measured individual link delays based on local clocks and the Round-Trip Time (RTT) are utilized for calibrating the local clocks link by link. As previously mentioned, known two-way transfer protocols assume that the link delay is equal to RTT/2. Further, if we define the round trip time in a link path as the sum of a receiver-to-sender-node-delay, herein also referred to as a local-remote-delay, LRD, times a first calibration factor and the sender to receiver node delay, remote to local delay, RDL, times a second calibration factor and if it is determined that there is no asymmetry in the link path, LRD equals RLD, and the calibration factor in each direction is determined to be 0.5 such that LRD=RLD=RTT/2. If on the contrary, it is determined that there is an asymmetry in the link path, the respective calibration factors $c_{LRD}$ and $c_{RLD}$, in the respective direction LRD and RLD can be described as a fraction of the RTT, such that $LRD*c_{LRD}+RLD*c_{RLD}=RTT$. Other forms of calibration factor can be realized to achieve the same or similar effect, as known to those so skilled in the art Profiling Link Paths To continue, with reference now also to FIG. 2, as mentioned above as a first step the virtual path $VP_{AB}$ is established (S100) and a bidirectional data stream, DS, is then sent over the virtual path $VP_{AB}$ from A to B. Due to the different physical paths and other conditions of the link paths, e.g. traffic conditions, different buffering schemes in the network, or change(s) of link path due to a reroute in the network, the individual link paths will experience different static or dynamically changing link delays for the data stream, which link delays further typically are asymmetric in the different directions of transmission.

Figure 2:
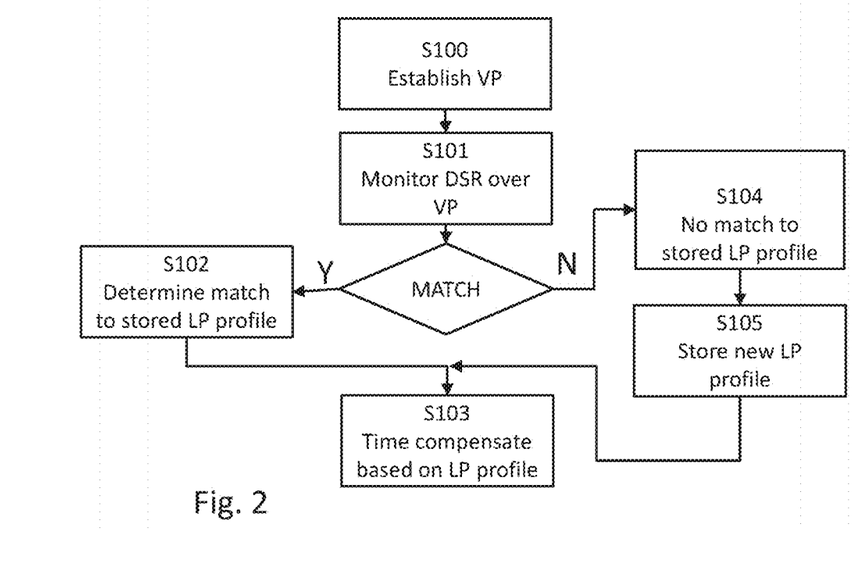
FIGS. 2-4 are schematic flow charts illustrating embodiments of a method according to the present inventive concept.

According to the present inventive concept, Node B (and/or Node A) is arranged to monitor the corresponding received data stream DSR with respect to predetermined data stream characteristics (S101) and analyze the monitored data stream characteristics to profile characteristics, i.e. determine link path properties, of the link path over which the data stream DSR is received. The monitored data stream characteristics and/or link path properties of the monitored link path are analyzed to determine if the monitored data match (<MATCH>) to a predetermined, i.e. previously determined and stored, link path link profile (LP profile) (S102). This is performed to provide information on which link profile to use for the particular link path over which the data stream is received. The characteristics of a particular link path is thus observed on the link path and preferably stored as part of the calibration, such that when the link path re-occurs, the correct calibration factor can be chosen and used. Such link path characteristics may include RTT, time-error, trace route path etc. In a final step (S103) the LP profile may be used to time compensate Node A and/or Node B based on the (matching/selected) LP profile.

According to an embodiment, when there is no match to a previously stored LP profile (S104) an additional/new link profile is created based on the determined link path properties which are provided by analyzing the monitored data stream characteristics of the received data stream, and the new link profile is then added to a set of available LP profiles (S105).

The LP profile may include at least one of a measured Round trip time, RTT, Packet Delay Variation, PDV, link path performance, packet loss, wander, quality indicator (to determine degree of trusted link), link delay in one or both directions between the sender node and the receiver node, average delay between the sender node and the receiver node, calibration factors indicating the amount of asymmetry in the link path delay in respective opposite directions of the virtual path, path indicator, traceroute or other indicator of path, and a delay correction factor. Preferably, a metric based on several of the above link data stream characteristics is used.

According to the invention, deriving a delay correction factor of the predetermined link profile as done in step S103, is performed if it is determined that the monitored at least one data stream characteristics of the received data stream and/or at least one link path property matches to an existing link profile. However, when no such match can be found, a new delay correction factor is calculated for the VP by using an estimated time error ΔTE over the VP using two-way time transfer calculations and a calibrated time difference of a trusted source, i.e. a time difference between the local time in the node and time received in a calibrated virtual path from a node in a calibrated state, a local clock in holdover mode, or a directly connected clock source. The estimated time error ΔTE over said virtual path between the first node A and the second node B can then be compensated using the new delay correction factor.

Matching Stored Link Profiles

Node B may continuously monitor and analyze the at least one predetermined data stream characteristics of the received data stream DSR, and when determining that the data stream characteristics and/or link path properties of the incoming link match a previously stored LP profile, Node B switches to, or continues to use, at least selected data, e.g. calibration factors such as a stored delay correction factor of, the stored LP profile for calibrating or time compensating the virtual path or local clock of Node B (S103).

Static Calibration, Symmetric Link(s)

Assuming now that we consider Node B to be a local node and Node A to be a remote node. In a first scenario, the Round-Trip Time, RTT, over a link path, e.g. LP1, or one of a multiple of link paths and devices, e.g. LP1, LP2 and LP3, forming the network 100 is the sum of link delays in two directions, a Local Remote Delay (LRD) and a Remote Local Delay (RLD), that is RTT=LRD+RLD. Further assuming a symmetric distribution, LRD=RTT/2 and then that RLD=RTT/2 between the two nodes Node A and Node B. Thus, Node A and B may not at all be aware of the underlying infrastructure and that links from Node A and Node B perspective may consist of multiple different underlying links and node hops. A static calibration of $VP_{AB}$ may thus be performed based on, monitoring a data stream characteristics/link path property, the measured RTT over the virtual path, i.e. here active link path LP1 and optionally matching the measured RTT to a previously stored LP profile (S102).

Static Calibration, Known Asymmetric Link(s)

Assuming now that we consider Node B to be a local node and Node A to be a remote node. In this second scenario, the Round-Trip Time, RTT, over a link path, e.g. LP1, or multiple link paths and devices, e.g. LP1, LP2 and LP3, forming the network 100, is assumed to be the sum of a Local Remote Delay (LRD) and a Remote Local Delay (RLD), that is RTT=LRD+RLD. However, the distribution is now asymmetric. A respective weighed calibration factor, a and b, is applied to the delay values, such that LRD=RTT*b and then RLD=RTT*a, between the two nodes. Node A and B may not at all be aware of the underlying infrastructure and that links from Node A and perspective may consist of multiple different underlying links and node hops. A static calibration of $VP_{AB}$ may thus be performed based on the measured round-trip time RTT and/or RLD and LRD. A link path can again be statically calibrated by assuming LRD and RLD is multiplied with a calibration factor but where the calibration factor is the opposite of each other per LP, e.g. LRD*¼+RLD*¾=RTT. A static calibration of $VP_{AB}$ may thus be performed based on, monitoring a data stream characteristics/link path property, the measured RTT and delays, over the virtual path, i.e. here active link path LP1 optionally matching the measured RTT to a previously stored LP profile (S102).

Multiple Link Profiles for a Link Path

The inventive concept utilizes the concept that different causes providing different delay in a link path also create different characteristics in delay and link properties. Multiple different link profiles may thus be determined for the same link path depending on the conditions on the link path and can be used to handle and accommodate changes in the underlying infrastructure to maintain an accurate clock as is shown in this invention.

Storing Link Profiles

Since the link path delay can be changed due to external factors and also the asymmetry can be changed, different created link profiles are stored in a storage, where the combination of the asymmetric/symmetric calibration factors for RLD and LRD is stored together with the RTT is stored in each LP profile. Moreover, for each LP profile also other knowledge and statistics can be stored, e.g. PDV values and performance data for this profile may tell how reliable and how trusted the data in exactly this LP profile is, which gives a measure for if this LP profile should be chosen at a certain point.

Synchronization Strategy

A synchronization strategy according to the inventive concept concerns different strategies for calibrating the first and second node, e.g. node A and node B in FIG. 1, and virtual paths including, symmetric static calibration, asymmetric static calibration. The inventive concept thereby allows a degree of freedom concerning how synch routing can take place regardless of the path of synchronization after calibration has taken place. Redundancy in route selection may advantageously help the network to calibrate and solve startup problems.

Monitoring Data Stream Characteristics and Link Path Properties

According to an embodiment of the inventive concept, when the apparatus Node B is calibrated, the local clock of Node B can be considered sufficient for at least some holdover time. That is, in the event that link path properties of the currently monitored link path change and there is therefore a change in asymmetries of the local remote- or remote local link delay, LRD and DRL, after a certain time period Node B can determine the received clock offset from the link path and compensate for the received clock offset with regards to the local clock which was previously locked to a trusted link path source.

At the event that monitored link path properties change, e.g. if the virtual path $VP_{AB}$ switches from LP1 to LP2 or to some new link path, Node B can choose to use an already stored link profile if the monitored link path properties/data stream characteristics of the new link path behavior matches that stored profile. In another case, the apparatus can store a new profile for use right away and later, (S104).

At a scenario, when a first link path, e.g. LP1, has been switched to a second link path, e.g. LP2, when the second link path is adding delay it may be sufficient to monitor the round trip time, RTT, characteristics to identify which one of a set of possible link paths it switched to, by comparing the measured RTT with stored link profiles to decide which link profile matches the current link path.

By recognizing the RTT at a change, a link profile can be verified if the apparatus is activated from an unknown state such as power up or when being "off grid" for a while and again is connected to the network on any previously or now existing LPs.

For the case where Node B is uncalibrated, or the identification of correct link profile is not distinct, the link path will remain uncalibrated. For such scenarios it is conceivable to wait for conditions to allow for such a selection to be made.

According to an embodiment, if the RTT value is below a predetermined limit, which may optionally be configurable, and a length of a cable used to provide the link path is considered sufficiently short such that any asymmetries can be considered negligible, the link path is calibrated through self-assignment. The apparatus can be connected to several link paths and each LP connected to a source or sources will increase the accuracy of the apparatus generated output time.

Trimming the Local Clock and Link Profiles

Figure 3:
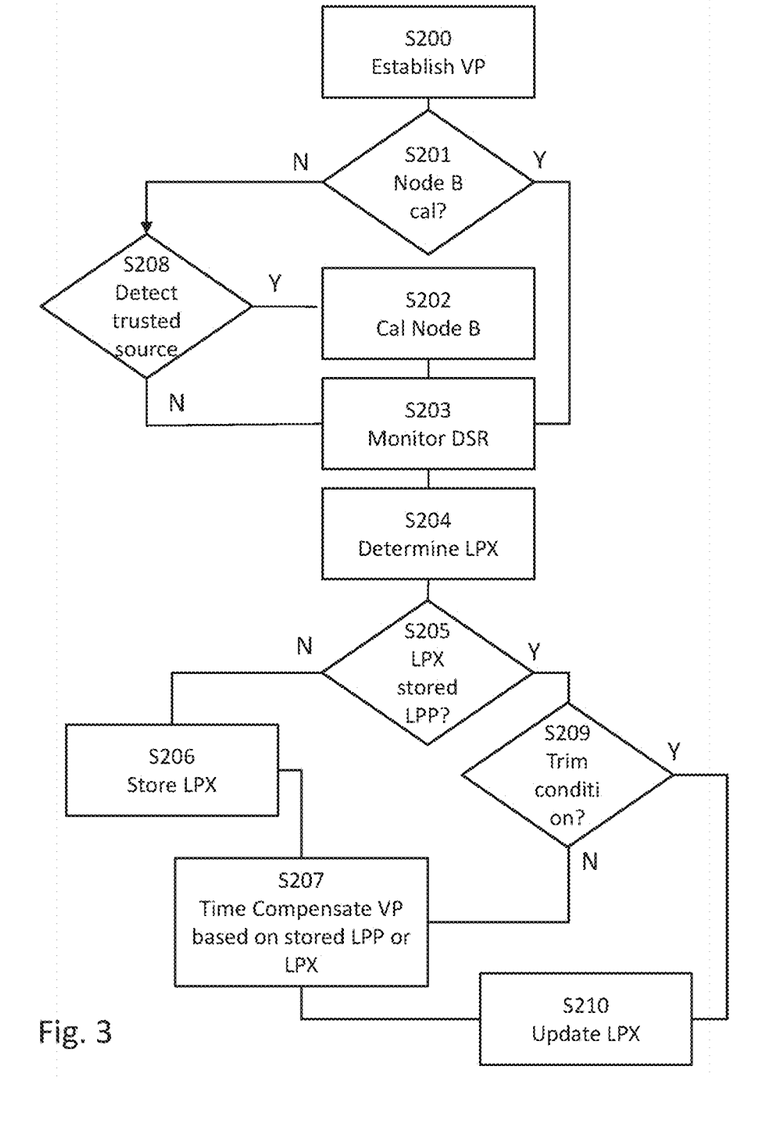

Consider the virtual path $V_{AB}$ of FIG. 1 with reference to FIG. 3. Initially, the virtual path $V_{AB}$ is established (S200) and subsequently it is determined whether Node B (and/or Node A) is calibrated or not. If Node B is not calibrated, and there is a trusted source present, Node B is calibrated (S202). Node B (and/or Node A) now monitors the received data stream DSR with respect to predetermined data stream characteristics (S203) and analyzes the monitored data stream characteristics to determine the monitored LP profile (LPX) (S204). If the monitored data does not match to a predetermined, i.e. previously determined and stored LP profile (LPP) the LPX is stored as a new LP profile (S206). The characteristics of the particular link path is thus observed and stored as part of the calibration to allow a correct calibration factor to be used. In a final step (S207) the LP profile may be used to time compensate the virtual path VP based on stored LP profile LPX. After some time period there may have occurred multiple changes of active link path within the virtual path. These link path changes may cause an actual time output offset accuracy of Node B to have been poisoned by timing filters and algorithms.

According to an embodiment of the inventive concept, the apparatus of a node is configured to check its own clock accuracy and trim it at given conditions.

Examples of conditions under which the apparatus of Node B should consider trimming its clock is when it is connected to known accurate sources where the RTT calibration factor is known, e.g. when a trusted source is detected (S208)
  a reliable local clock is connected and recognized
  a reliable clock is connected and is remote, like a GNSS trusted clock
  a known link RTT is detected and this RTT is known to as RTT/2=RLD=LRD
  a known link RTT is detected during monitoring of the data stream DSR and this RTT is known to as RTT/x=RLD*x=LRD*y, where x and y, the asymmetry calibration factors are very trusted, in a case where the LP may now actually consist of very few actual links and hops within a network.
    a known link RTT is detected and it has been stored that this RTT matches a profile with very good PDV and/or performance data
    another trusted link with known calibration factor and properties is connected and other links are detected to have skewed offsets not matching or a little shifted calibration factors for this profile.

Optionally it is possible to choose prioritized order of the above to trim the apparatus of Node B, or trimming can be automatically performed via an algorithm to choose what should be best for the apparatus.

The apparatus of Node B can also trim/update, not only the clock but optionally after determining if trim conditions are fulfilled (S209), also previously stored LP profiles (S210) at this stage. The stored LP profiles may have been created after the first calibration of Node B, or when a local trusted source was once connected. These automatically (AUTO CAL) created LP profiles can be assumed to have been poisoned a bit when created, when created without in between being locked to a well trusted link profile. When determining, in step (S205), that the monitored DSR corresponds to a previously stored LP profile and trim conditions are fulfilled (S209) the stored LP profile is updated with the fresh LP profile, LPX.

Figure 4:
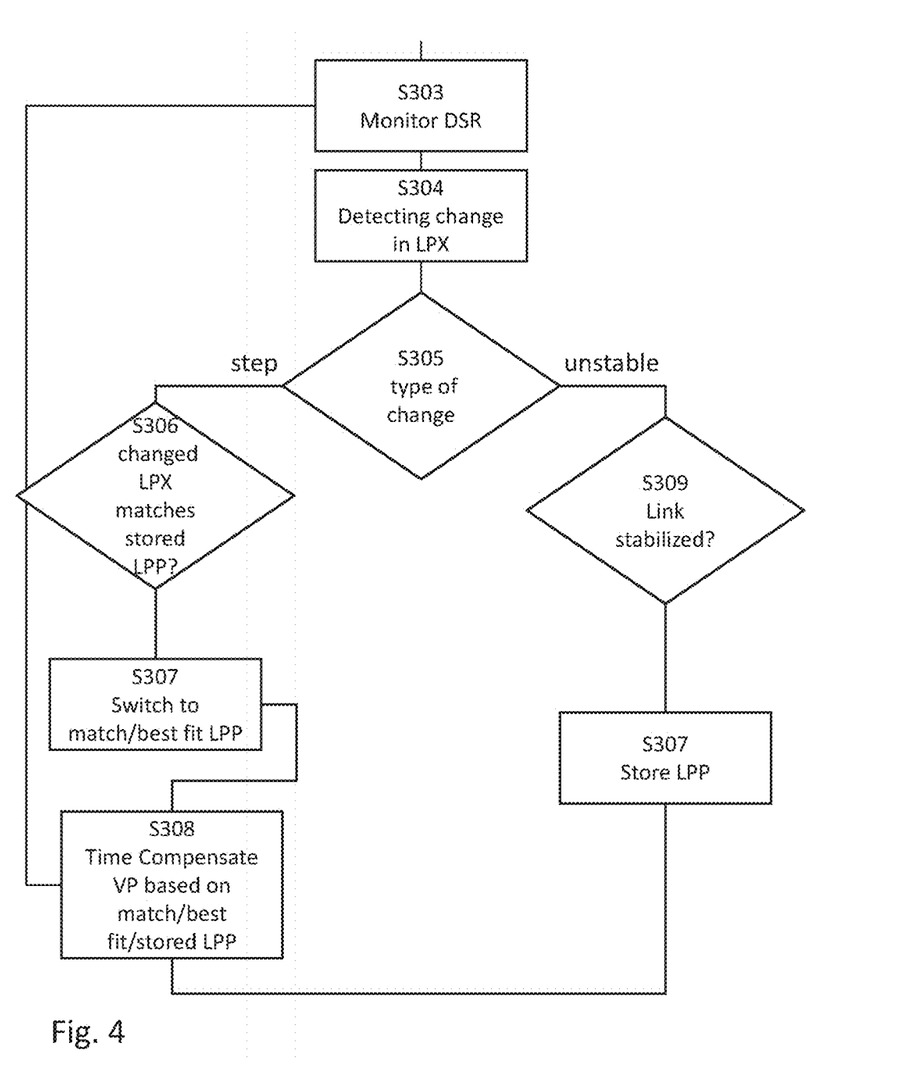

Referring now to FIG. 4, according to an embodiment, by using holdover and timers and filter for holdover etc. the apparatus of Node B can wait until a link path has stabilized before changing to a link profile or AUTO CAL and store this new link profile. Following a step of monitoring the DSR (S303) the apparatus of Node B (and/or Node A) shall at determining a link path change (S304) check locally for other well-known trusted sources like another link path or a connected clock. If no trusted source is found, it shall wait for its only clock source, the link path to stabilize (S309) and then after the link is considered stable lock on this link and store a new link profile (S307) which is utilized for time compensating the virtual path VP (S308). In this situation, the above-mentioned risk of "poison" occurs, which latter can be "washed" once a known trusted link profile is chosen.

A link path shall possible be considered untrusted if upon monitoring of the received data stream at least one of the following conditions is detected: loss of frame, repeated frame pattern, a non-acceptable high repeated packet number, PDV, value, missing packets, too many packets missing and other in hand measures.

The apparatus is arranged to automatically handle the above scenarios of static asymmetries, dynamic asymmetries caused by PDV and pseudo static asymmetries to ensure that absolutely the best time output is guaranteed at all time and to auto correct itself via trimming when possible.

Upon detecting changes in at least one selected monitored data stream characteristics, or upon detecting change in time data during monitoring of at least one data stream characteristics (S304) the node may compare a current value of the selected monitored data stream characteristics with corresponding data in the stored link profiles (S306), and if there is a match switch to the stored known or best fit link profile (S307), or at least switch to a delay correction factor of a best fit link profile which is utilized for time compensating the virtual path VP (S308). The change in data stream characteristics or time data may be monitored within some predetermined ratio. Time data may refer to for instance detecting a new RTT, a new value on PDV, or change in packet loss rate etc. An (optionally abrupt) change in time data may be detected with respect to a stable local clock, an external clock or with respect to other time data of other virtual paths. The detected change may also be a deviation in time in one of RTT, PDV, and packet loss rate. If no matching LP profile is found the node may signal error and go to holdover Probing According to an embodiment of the inventive concept, the step of establishing the at least one virtual path between the first node and the second node comprises providing a configuration utilizing initial (or first) configuration data between the first node and second node. The method further comprising: for a selected virtual path of the at least one virtual paths: probing the selected virtual path utilizing a probing function applying a plurality of predetermined probe configuration data, which may be a set of probe configuration data, onto the selected virtual path, monitoring (which may include storing and/or analyzing) performance over the selected virtual path for each one of the plurality of probe configuration data; and determining optimized configuration data for the configuration between the first node and second node based on the monitored performance.

According to an embodiment of the method, the selected virtual path is parallel to the virtual path over which the bidirectional data stream is sent.

The probing function may further comprise performing a trace route for each probe configuration data. The probe configuration data comprises at least one of settings for DSCP, Ethernet priority, bitrate and MTU, and may be applied stepwise.

According to an embodiment of the method, the optimized configuration data is determined with respect to achieving a lowest jitter performance such e.g. as an estimate represented by a 0,1-percentile jitter.

The invention claimed is:

1. A method, comprising:
   establishing at least one virtual path comprising at least one link path over a communication network for communication between a first node and a second node, wherein said at least one virtual path is bidirectional;
   sending a bidirectional data stream over said at least one virtual path; and
   performing an asymmetry delay error compensation to minimize a time difference bias when using two-way time transfer in the communication network, the asymmetry delay error compensation performed independently of any Global Navigation Satellite System (GNSS), the asymmetry delay error compensation performed based on, at least one node of said first node and second node,
      receiving a data stream that corresponds to the bidirectional data stream and monitoring data corresponding to the received data stream, the monitored data including at least one data stream characteristic of the received data stream and/or at least one link path property of a particular link path via which the received data stream is received; and
      determining a delay correction factor, the determining including
         deriving a delay correction factor of a stored link profile as the determined delay correction factor, in response to a determination that the monitored data matches the stored link profile, or
         calculating a new delay correction factor for said at least one virtual path as the determined delay correction factor by using an estimated time error between said first node and said second node over said at least one virtual path using two-way time transfer and a calibrated time difference of a trusted source, in response to a determination that the monitored data does not match any stored link profile; and
      compensating a time error between said first node and said second node over said at least one virtual path using said determined delay correction factor.

2. The method according to claim 1, wherein said trusted source is one of a calibrated virtual path from a node in a calibrated state, a local clock in holdover mode, and a directly connected clock source.

3. The method according to claim 1, further comprising communicating a state of calibration of said first node and said second node to neighboring nodes.

4. The method according to claim 1, further comprising, in response to calculating the new delay correction factor for said at least one virtual path in response to the determination that the monitored data does not match any predetermined link profile, storing a new link profile based on said monitored data and said new delay correction factor.

5. The method according to claim 1 further comprising, in response to a determination that said first node and said second node are in a calibrated state, setting a state of calibration of said at least one virtual path and/or link profiles of said at least one virtual path as calibrated.

6. The method according to claim 1, wherein said at least one virtual path is calibrated through self-assignment.

7. The method according to claim 1, further comprising adjusting at least one stored link profile or creating a replica of the at least one stored link profile based on said monitored data.

8. The method according to claim 1, further comprising:
   detecting a change in the particular link path via which the received data stream is received, the change including at least one of
      a change in at least one selected monitored data stream characteristic or link path properties of the particular link path, or
      a change in time data during monitoring of the at least one selected monitored data stream characteristic of the particular link path,
   comparing a current value of the at least one selected monitored data stream characteristic with corresponding data in said a plurality of stored link profiles, in response to detecting the change, and
   in response to the comparing the current value,
      using a delay correction factor of a best fit link profile of the plurality of stored link profiles as the determined delay correction factor, in response to a determination that the current value matches corresponding data of at least the best fit link profile, or
      going to holdover, in response to a determination that the current value does not match corresponding data of any link profile of the plurality of stored link profiles.

9. The method according to claim 8, wherein said change in the time data is detected with respect to a local clock, an external clock, or time data of other virtual paths.

10. The method according to claim 1, further comprising:
    comparing time in relation to said first node and said second node, and
    steering said second node acting as a slave to a time of the first node acting as a master, based on the comparing.

11. The method according to claim 1, wherein
    the establishing the at least one virtual path comprises providing a configuration utilizing initial configuration data between said first node and said second node, and
    the method further comprises:
       for a selected virtual path of said at least one virtual path:
          probing the selected virtual path, based on utilizing a probing function to apply a plurality of probe configuration data onto said selected virtual path;
          monitoring performance over said selected virtual path for each one of said plurality of probe configuration data; and determining optimized configuration data for said configuration between said first node and said second node based on the monitored performance.

12. The method according to claim 11, wherein the selected virtual path is parallel to the at least one virtual path over which said bidirectional data stream is sent.

13. The method according to claim 11, wherein said probing function further comprises performing a trace route for each probe configuration data of the plurality of probe configuration data.

14. A node in a communication system arranged for node to node communication, the node comprising:
   a memory storing computer-readable instructions, and
   a processor configured to execute the computer-readable instructions to perform the method according to claim 1.

15. A non-transitory computer readable storage medium storing computer-readable instructions executable by a processor to cause the processor to perform the method according to claim 1.

* * * * *